(12) United States Patent
Scano

(10) Patent No.: US 7,836,182 B1
(45) Date of Patent: Nov. 16, 2010

(54) NETWORK DEVICE HAVING UNIVERSAL ADDRESS POOL MANAGER AND A MULTI-PROTOCOL NETWORK ADDRESS POOL

(75) Inventor: John C. Scano, Dracut, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 765 days.

(21) Appl. No.: 11/300,850

(22) Filed: Dec. 15, 2005

Related U.S. Application Data

(60) Provisional application No. 60/734,809, filed on Nov. 9, 2005.

(51) Int. Cl.
*G06F 15/173* (2006.01)
*G06F 15/16* (2006.01)
(52) U.S. Cl. .................................. 709/226; 709/245
(58) Field of Classification Search .................. 709/245, 709/226, 228, 227, 223, 250, 225, 217, 220, 709/203, 200, 230, 238, 213, 224, 218; 370/401, 370/475, 392, 389, 352, 469, 466, 471, 338; 714/E11.084; 726/1, 11, 12
See application file for complete search history.

(56) References Cited

U.S. PATENT DOCUMENTS

| | | | |
|---|---|---|---|
| 6,208,656 B1 * | 3/2001 | Hrastar et al. ............... | 370/401 |
| 6,393,484 B1 * | 5/2002 | Massarani .................... | 709/227 |
| 6,427,170 B1 * | 7/2002 | Sitaraman et al. ........... | 709/226 |
| 6,614,788 B1 * | 9/2003 | Martin et al. ................ | 370/392 |
| 7,395,343 B1 * | 7/2008 | Baker et al. ................. | 709/230 |
| 2004/0165602 A1* | 8/2004 | Park et al. .................... | 370/401 |
| 2005/0097223 A1* | 5/2005 | Shen et al. ................... | 709/245 |
| 2005/0182829 A1* | 8/2005 | King et al. ................... | 709/220 |
| 2006/0104226 A1* | 5/2006 | Ahn ............................. | 370/315 |

* cited by examiner

*Primary Examiner*—Saad A Waqas
(74) *Attorney, Agent, or Firm*—Shumaker & Sieffert, P.A.

(57) ABSTRACT

The invention relates to a universal Address Pool Manager (APM) for processing network access address requests from clients operating at one of many access protocols. The APM, located within a network device, such as a router, manages an aggregated pool of network addresses and assigns addresses to the clients from the pool in accordance with the multiple access protocols. The aggregated address pool may be co-located within the network device with the APM, or alternatively, the address pool may be located within an off-box network device, such as an off-box authentication server or an off-box DHCP server. Utilization of an APM that manages an aggregated address pool for processing requests from multiple access protocols may reduce operational costs for network service providers that support multiple access networks.

19 Claims, 4 Drawing Sheets

NETWORK DEVICE HAVING UNIVERSAL ADDRESS POOL MANAGER AND A MULTI-PROTOCOL NETWORK ADDRESS POOL

This application claims the benefit of U.S. provisional application Ser. No. 60/734,809, filed Nov. 9, 2005, the entire content of which is incorporated herein by reference.

TECHNICAL FIELD

The invention relates to computer networks and, more particularly, to address assignments to devices within computer network access.

BACKGROUND

Service provider networks provide network access to subscriber devices located within the network. Subscriber devices may include personal computers, laptops, workstations, personal digital assistants (PDAs), wireless devices, network-ready appliances, print servers, or other devices. During the network access process, the subscriber devices issue requests for addresses via any of numerous network protocols such as, Point to Point Protocol (PPP), Dynamic Host Configuration Protocol (DHCP), Dynamic Host Configuration Protocol version 6 (DHCPv6), Internet Protocol version 6 (IPv6) or other network access protocol.

In response, the service provider allocates network addresses and assigns the addresses to the subscriber devices. Often the address configuration is unique for each protocol, and the network service provider maintains and manages multiple, independent pools of network addresses from which to assign addresses. For example, a service provider often maintains and manages separate addresses pools for the DHCP protocol and the PPP protocol.

Coordinating use of separate address pools includes the cumbersome task of ensuring that the address pools do not overlap, which is especially challenging given the fact that the volume of requests for the different protocols varies greatly. This often forces the network service provider to use oversized address pools for each protocol, potentially resulting in many unused addresses in one pool or the other at any given moment.

SUMMARY

In general, the invention relates to a network device that incorporates a universal Address Pool Manager (APM) for processing network address requests from many different network access protocols. Examples of different protocols supported by the APM may include Point to Point Protocol (PPP), Dynamic Host Configuration Protocol (DHCP), Dynamic Host Configuration Protocol version 6 (DHCPv6), Internet Protocol version 4 (IPv4), and Internet Protocol version 6 (IPv6).

The APM, located within a network device, such as a router, manages an aggregated pool of network addresses and assigns addresses to the clients in accordance with the multiple access protocols. The aggregated address pool may be co-located within the network device comprising the APM, or alternatively, the address pool may be located within an off-box network device, such as an off-box authentication server or an off-box DHCP server. Utilization of an APM that manages an aggregated address pool for processing requests from multiple access protocols may reduce operational costs for network service providers that support multiple access networks.

In one embodiment, a method comprises receiving within a network device network address requests from a plurality of clients in accordance with a plurality of different protocols. The method further comprises processing the requests with an address manager executing within the network device to select network addresses from an aggregated pool of network addresses, and assigning the network addresses to the clients.

In another embodiment, a network device includes one or more interface cards that receive network address requests from a plurality of clients in accordance with a plurality of different protocols. The network device further includes an address manager executing within a control unit that processes the requests, and an aggregated pool of network addresses. In response to the network address requests, the address manager selects network addresses from the aggregated pool of network addresses.

In another embodiment, a network system includes a plurality of subscriber devices; and a router. The router includes an address manager and an aggregated pool of network addresses. The address manager presents a single interface by which to receive network address requests for a plurality of different network protocols and assigns the network addresses to the plurality of subscriber devices from the single aggregated pool of network addresses.

In another embodiment, the invention is directed to a computer-readable medium containing instructions. The instructions cause a programmable processor to receive network address requests from a plurality of clients in accordance with a plurality of different protocols. The instructions further cause the processor to process the requests with an address manager to select network addresses from an aggregated pool of network addresses; and assign the network addresses to the clients.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
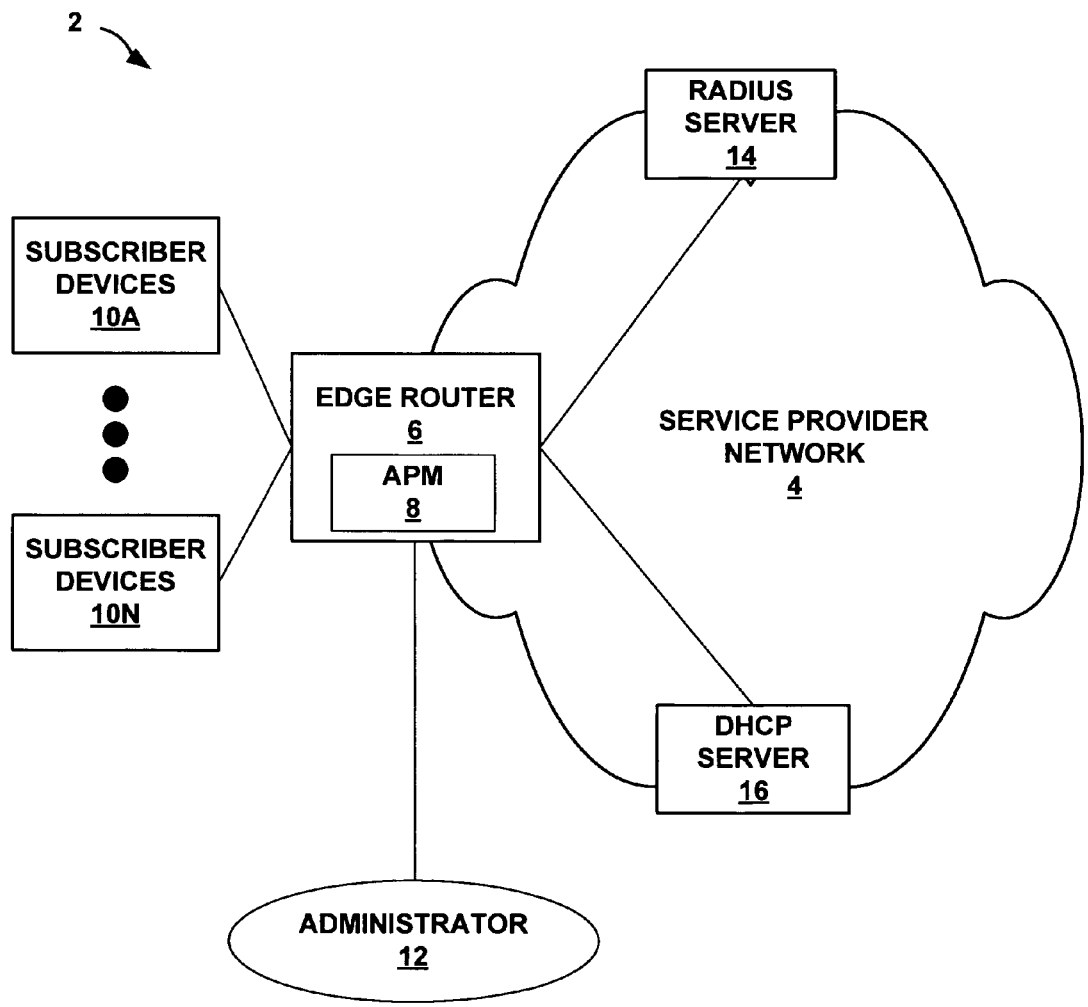
FIG. 1 is a block diagram illustrating an example network system in which an edge router incorporates a universal address pool manager (APM) to allocate network addresses to subscriber device.

FIG. 1 is a block diagram illustrating an example system 2 in which an edge router 6 provides subscriber devices 10A-10N ("subscriber devices 10") with access to a service provider network 4. Subscriber devices 10 may include personal computers, laptops, workstations, personal digital assistants (PDAs), wireless devices, network-ready appliances, print servers, or other devices. Service provider network 4 represents any computer network, such as an Internet Protocol (IP)-based computer network.

For exemplary purposes, the techniques are described with respect to edge router 6. However, the techniques may be applied to any network device that dynamically allocates network addresses to subscriber devices. For example, the techniques may be applied to dedicated servers for managing network addresses, gateways, virtual private network (VPN) appliances, network caches, network acceleration devices, intelligent switches or other devices.

Moreover, service provider network 4 may include additional components not shown in FIG. 1 that provide network connectivity and delivery of services to subscriber devices 10. For example, in some embodiments, service provider network 4 may include one or more digital subscriber line access multiplexers (DSLAMs) that connect directly to subscriber devices 10. Edge router 6 may incorporate a Broadband Remote Access Server (BRAS) to aggregate outputs from the DSLAMs into a higher-speed uplink to service provider network 4.

Subscriber devices 10 may operate according to any of numerous protocols, such as Point to Point Protocol (PPP), Dynamic Host Configuration Protocol (DHCP), Internet Protocol version 4 (IPv4), or Internet Protocol version 6 (IPv6). Edge router 6 processes requests from the various subscriber devices 10 with a universal Address Pool Manager (APM) 8 that manages an aggregated pool of network addresses. As discussed in further detail below, APM 8 is a software module executing within an operating environment provided by edge router 6. APM 8 provides a universal interface by which other software modules within edge router 6 may request and receive a network address from the aggregated address pool regardless of the protocol for which the address is needed.

APM 8 provides a user interface by which an administrator 12 manages the address pool and defines rules that govern the assignment of addresses to subscriber devices 10. For example, by interacting with the user interface, administrator 12 may define ranges of addresses from which to select and allocate addresses. In addition, administrator 12 may designate one or more addresses ranges for exclusion from the selection process. Administrator 12 may define one or more rules that designate certain address ranges based on protocol, rules for controlling lease expiration, default parameters for various types of requested addresses (e.g., IPv4 or IPv6 addresses) or other rules. Once configured, APM 8 presents a universal interface to other software modules executing within edge router 6 so that the various software modules need not substantially modify addresses based on the particular protocol.

Further, administrator 12 may configure the aggregated address pool to be co-located with APM 8 within edge router 6. Alternatively, administrator 12 may configure APM 8 of edge router 6 to provide seamless, universal allocation of addresses from one or more address pools located within one or more off-box network devices, such as an off box authentication server 14, an off-box DHCP server 16, or an off-box DHCP server proxy. Off-box authentication server 14 may be a Remote Authentication Dial-In User Service (RADIUS) server. Once configured, APM 8 processes requests from numerous access protocols by assigning each requesting subscriber device 10A-10N with an address from the aggregated address pool.

In this manner, APM 8 provides generalized management and seamless access to an aggregated address pool for servicing requests from multiple access protocols. The address pool is referred to as an "aggregated address pool" in that, from the view perspective of peer software modules, APM 8 uses a single address pool that aggregates network addresses allocated to different protocols and that may vary in format based on the type of protocol.

Utilization of APM 8 may provide certain advantages, such as potential reduction of operational costs for network service providers that support multiple access networks. Furthermore, utilization of APM 8 may simplify a transition process for a network service provider from one version of a protocol (e.g., IPv4) to another protocol (IPv6). As another example, APM 8 may allow service providers to more easily transition from PPP to DHCP. APM 8 may allow the service providers to provide gradual transition between the protocols. Additionally, use of an aggregated address pool may reduce the number of unused addresses and, therefore, may allow the service provider to allocate fewer overall network addresses to the aggregate address pool.

Figure 2:
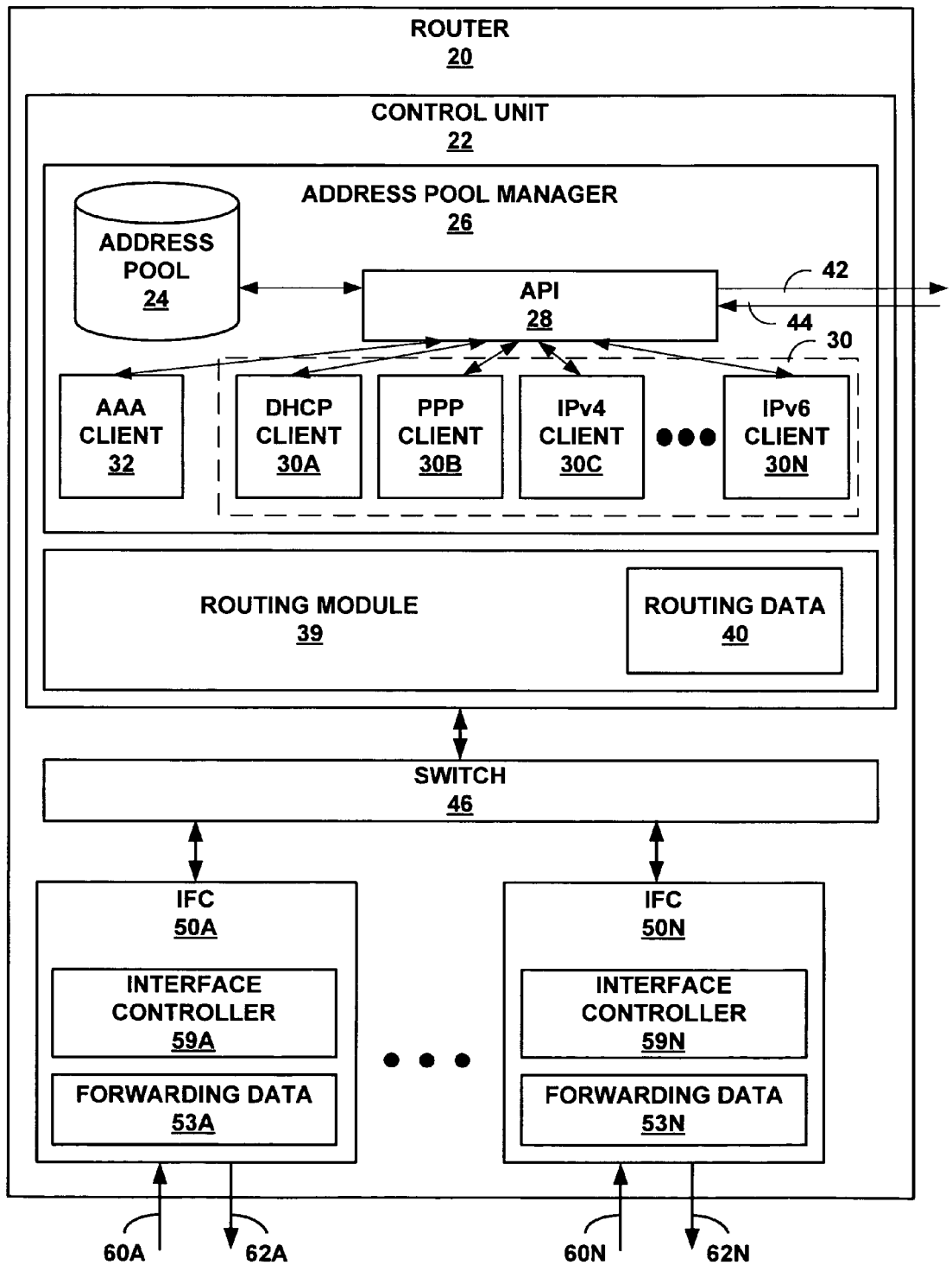
FIG. 2 is a block diagram illustrating an exemplary embodiment of a router in accordance with the principles of the invention.

FIG. 2 is a block diagram illustrating an exemplary embodiment of a router 20. Router 20 may operate substantially similar to edge router 6 (FIG. 1). As described further below, router 20 assigns network addresses from an aggregated address pool consistent with the principles of the invention.

In the illustrated embodiment, router 20 includes a plurality of interface cards (IFCs) 50A-50N ("IFCs 50") that receive data packets from subscriber devices (e.g., subscriber devices 10A-10N of FIG. 1) on inbound links 60A-60N ("inbound links 60") and send data packets to the subscriber devices on outbound links 62A-62N ("outbound links 62"). A high speed switch 46 couples IFCs 50 to a control unit 22. In general, control unit 22 uses a routing module 39 to maintain routing data 40 that reflects the current topology of the network in which router 20 is deployed.

IFCs 50 each maintain one of forwarding data 53A-53N ("forwarding data 53") that may be viewed as a subset of route data 40. In particular, IFCs 50 utilize forwarding data 53 to identify next hops and select output links 62A for packets. For example, when router 20 receives a packet via one of inbound links 60, the particular IFC 50 that received the inbound packet analyzes the packet to identify a "key" stored within a header of the packet. The IFC then maps the key to a corresponding next hop and then outputs the packet on one of outbound links 62 to direct the packet to the selected next hop.

In some situations, router 20 receives data packets destined for control unit 22. For example, router 20 may receive requests for network access. For example, IFC 50A may receive a new subscriber device access request via inbound link 60A. In this situation, an interface controller 59A of IFC 50A may dynamically create one or more software interface layers to support the subscriber device request. In this example, the subscriber device communicates the request with PPP; therefore, interface controller 59A creates a PPP interface layer within interface controller 59A. Alternatively, the subscriber device may communicate a request via DHCP, resulting in the creation of a DHCP layer within interface controller 59A. Any combination of interface layers from any number of access protocols may exist within interface controllers 59 of IFCs 50. Accordingly, the invention is not limited to the protocols described above.

IFCs 50 redirect access requests to appropriate software client applications 30 within an address pool manager (APM) 26 of control unit 22. Examples of software clients 30 include but are not limited to DHCP 30A, PPP 30B, IPv4 30C, and IPv6 30N. Software clients 30 are referred to as "clients" in that the software modules service protocol-specific network access requests by interacting with APM 26 or other software modules executing within control unit 22. Clients 30 receive network address requests from IFC interface layers and then invoke a universal interface provided by APM 26. For example, PPP client 30B receives address requests from a PPP layer created within interface controller 59A, and IPv6 client 30N receives address requests from an IPv6 layer created within interface controller 59A. Clients 30 then proceed to request an address from APM 26 by invoking an Application Programming Interface (API) 28 that provide one or more interface methods. The interface methods may be generic in nature, and overloaded to accept and provide protocol-specific address-related data. Additionally, a more centralized intermediate client, such as Address Assignment Authentication and Accounting (AAA) client 32, may invoke API 28 to interact with APM 26 on behalf of other software modules.

APM 26 responds to each client's address request by assigning an address from aggregated address pool 24. APM 26 assigns addresses in accordance with any rules specified by the service provider administrator 12 (shown in FIG. 1). Examples configuration rules include the definition of the network address, default servers, network basic input/output system (NetBIOS) servers, domain name service servers, and the like. In addition, APM 26 automatically handles format differences of addresses used by different protocols, such as IPv4 that requires a 32 bit address and IPv6 that requires a 64 bit address. APM 26 communicates the address assignment to the requesting client via API 28. The requesting client, one of clients 30, or AAA client 32, communicates the assigned address to the corresponding interface layer within IFCs 50, which in turn creates any required subscriber device interfaces and forwards the allocated network address in an access offer to the requesting subscriber device via one of outbound links 62.

In another embodiment, address pool 24 may be located within an off-box device, such as an off-box authentication server, an off-box DHCP server, or an off-box policy server that can allocate addresses. In this embodiment, APM 26 communicates an address request 42 to the aggregated address pool within the off-box device (not shown in FIG. 2). The off-box aggregated address pool then responds with an address assignment 44. As described above, APM 26 then communicates the address assignment to the requesting client via API 28.

An administrator (such as Administrator 12 of FIG. 1) or automated software agent configures APM 26 via a user interface (not shown). The user interface provides a common view of all aspects of APM 26 such that the administrator can easily define the address pool and rules governing the assignment of addresses even though the pool supports multiple protocols. Furthermore, as described above, the administrator may configure address pool 24 to be co-located with APM 26 within edge router 20, or alternatively, may configure address pool 24 to be located within an off-box network device, such as an off-box authentication server 14 (FIG. 1) or an off-box DHCP server 16 (FIG. 1). Moreover, having a user interface affiliated with APM 26 provides the administrator with a unified view such that addresses from multiple protocols may be managed in a manner that is transparent to the administrator.

The following example shows a command line interface (CLI) that, in response to a show command, lists combined statistics and configuration parameters for the aggregated address pool 24:

ROUTER 1>show pool fooBarPOOL
Pool Name—fooBarPOOL
Pool Id—1
Domain Name—TestDomain.com
Aggregate range—10.1.1.0-10.1.1.255
Support address types: DHCP, PPP
DHCP addresses: 234,232
PPP addresses: 145,433
High utilization threshold—85%
Abated utilization threshold—75%
Current utilization—0%
Utilization trap disabled
DHCP parameters:
Network—10.1.1.0
Mask—255.255.255.0
NETBIOS Node Type—0
Lease—Days: 0 Hours: 0 Minutes: 2 Seconds: 0
DNS Servers
NETBIOS Name Servers
Default Routers
Server Address—0.0.0.0
Linked Pool—none
PPP parameters:
startIpAddr
endIpAddr
warning
high Utilization
abated Utilization
snmpTrap
dns-address
primary-wins-address
secondary-wins-address
authentication
chap-challenge-length
fragmentation
initiate-ip
initiate-ipv6
ipcp
keepalive
magic-number
mru
multilink
passive-mode
peer
reassembly The architecture of router 20 illustrated in FIG. 2 is shown for exemplary purposes only. The invention is not limited to this architecture. In other embodiments, router 20 may be configured in a variety of ways. In one embodiment, for example, the functionality of control unit 22 may be distributed within IFCs 50. In another embodiment, forwarding data 53 may be maintained within control unit 22.

While described in reference to control unit 22, router 20 may comprise any device having a programmable processor or other hardware capable of executing instructions to carry out the functions described above. The programmable processor may replace control unit 22 or control unit 22 may include the programmable processor. Router 20 may store the instructions in a memory or other computer-readable medium (not shown in FIG. 2) or internally to control unit 22, in the event that control unit 22 includes the programmable processor.

Figure 3:
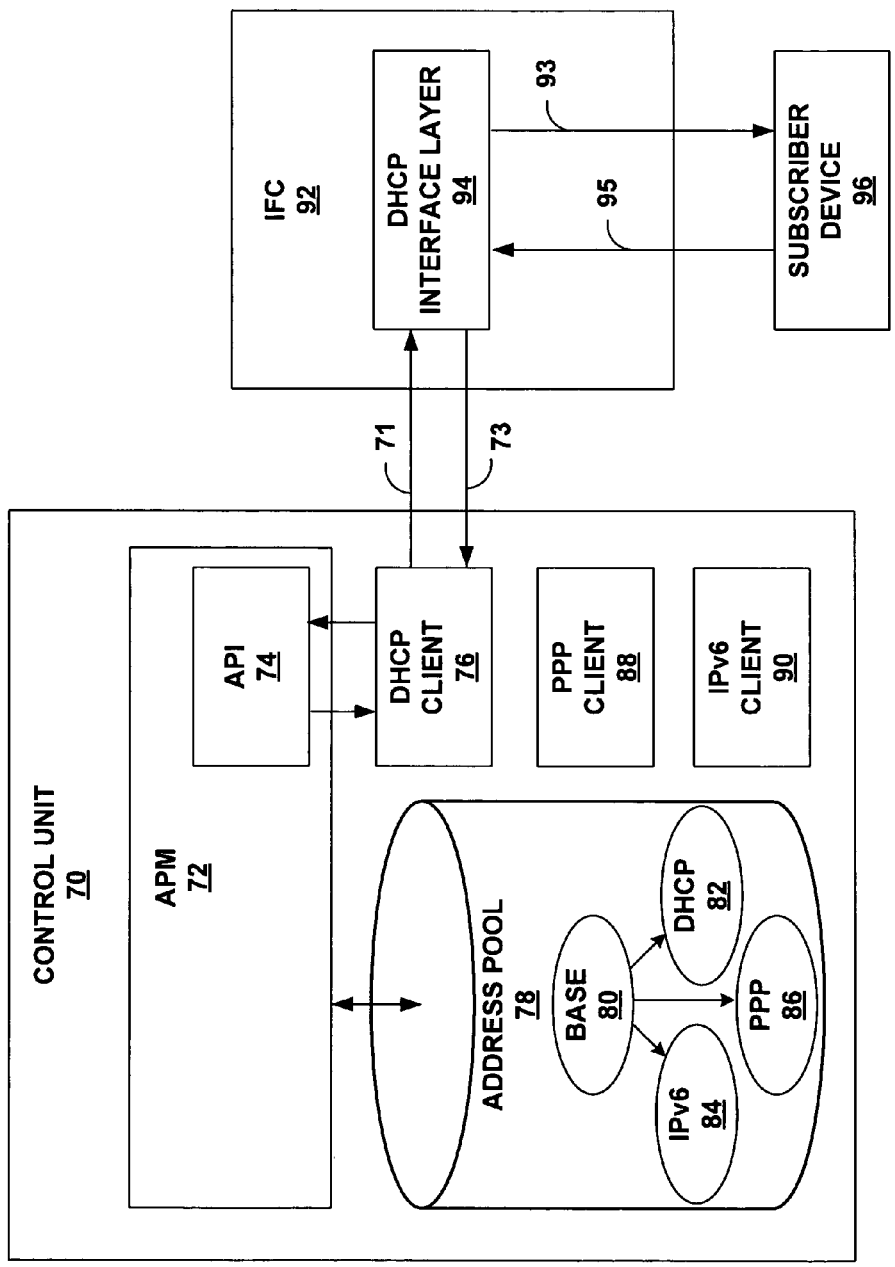
FIG. 3 is a block diagram illustrating exemplary portions of a router, such as the router of FIG. 2, when servicing a DHCP address request.

FIG. 3 is a block diagram illustrating exemplary portions of a router, such as router 20 of FIG. 2, when servicing a DHCP address request. In this example, a subscriber device 96 issues a DHCP access request 95 to IFC 92. Upon receiving DHCP access request 95, IFC 92 creates DHCP interface layer 94 to support the request. In an alternative embodiment, DHCP interface layer 94 may be statically created and, therefore, instantiated prior to receiving DHCP request 95.

Next, DHCP interface layer 94 issues an address request 73 to DHCP client 76 within control unit 70. DHCP client 76 invokes API 74 of APM 72 to request a network address. In one embodiment, APM 72 is designed with object-oriented software technologies such that addresses within an aggregated address pool 78 are represented as objects. For example, a base network address object data type may be defined, and protocol-specific network address objects may be dynamically instantiated within address pool 78 and inherit attributes from the base network object type. Examples of attributes for the address objects include base attributes 80, DHCP attributes 82, IPv6 attributes 84, PPP attributes 86, and other attributes. Base attributes 80 may be associated with base network address data types and used to define or store generic attributes needed for any type of network address assignment regardless of the type of access protocol, whereas the other attributes contain attributes specific to the particular protocols. For example, attributes supported by DHCP object data type may include but are not limited to a default router, dns server, domain name, lease time, netbios-name-server, and netbios-node-type. As another example, attributes supported by PPP include but are not limited to startIPaddr, endIPAddr, dns address, keepalive, and authentication.

In one embodiment, DHCP client 76 invokes API 74 with a generic address request that need not specify the type of access protocol. In this case, APM 72 may assigns an address from address pool 78 that includes all attributes contained within address pool 78. API 74 forwards the assigned address to DHCP client 76, which in turn forwards address information 71 with only base attributes 80 and DHCP attributes 82, since these attributes form the set of attributes needed by the DHCP protocol. In other words, in this example, embodiment, APM 72 assigns an address that includes all attributes contained within address pool 78 to all requesting clients, regardless of the client type. Each of the clients 76, 88 and 90 recognize which attributes are needed and which attributes may be discarded for the protocol utilized by IFC 92 for the particular subscriber device 96.

In another embodiment, DHCP client 76 invokes API 74 with a protocol-specific address request that identifies the request as a DHCP address request. APM 72 assigns an address from address pool 78 that includes base attributes 80 and DHCP attributes 82. For example, APM 72 may instantiate a network address within address pool 78 based on a data type associated with DHCP attributes 82, which in turn inherits attributes from base attributes 80. API 74 forwards the assigned address to DHCP client 76, which in turn creates address information 71. In this embodiment, each client 76, 88, 90 invokes API 74 with an address request specifying the client's protocol such that APM 72 instantiates a client-specific address object for each client request.

After DHCP client 76 creates the object and forwards address information 71, DHCP client 76 forwards address information 71 to DHCP interface layer 94, which creates address 93 and forwards address 93 to subscriber device 96, to complete the DHCP address request process.

Figure 4:
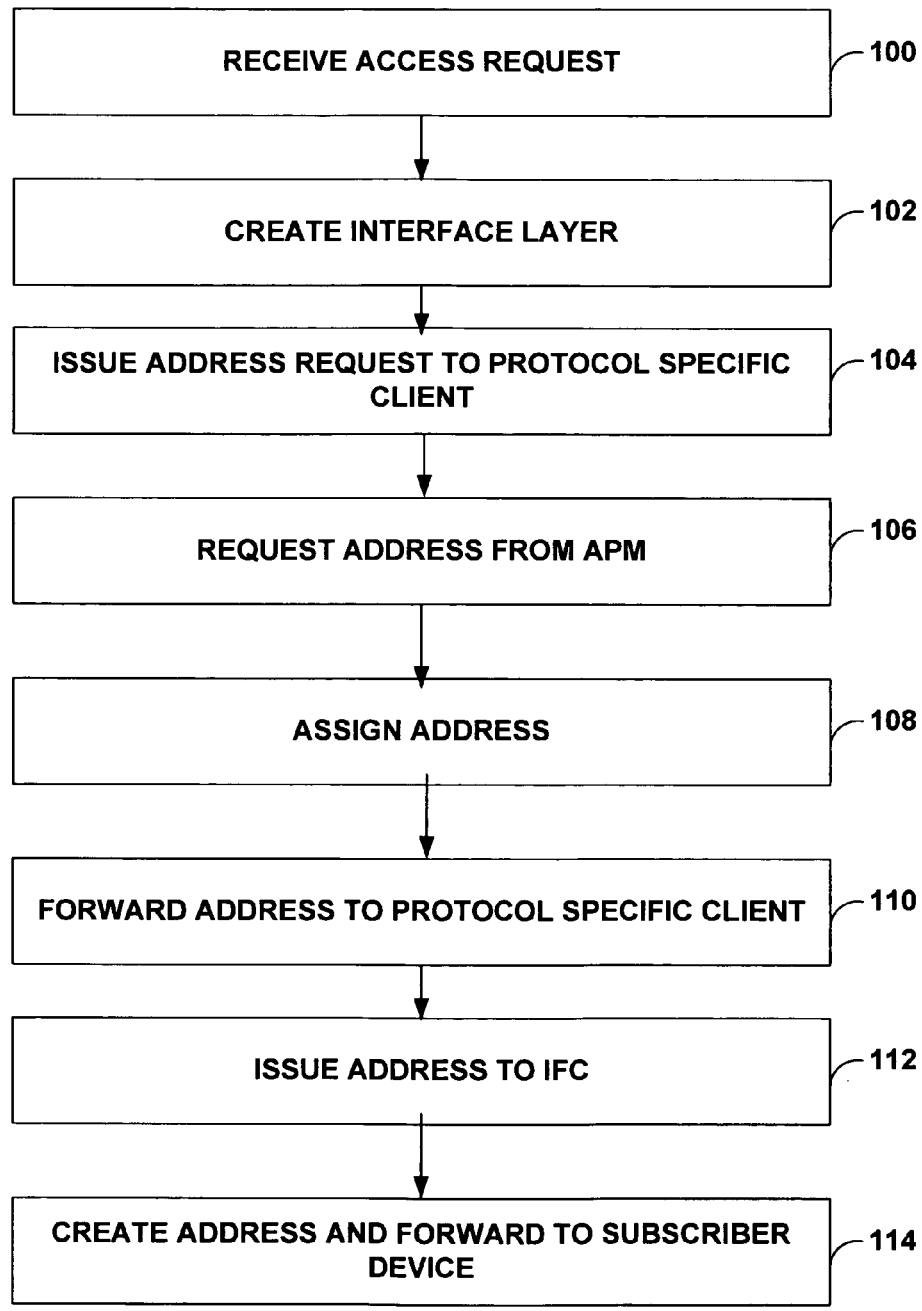
FIG. 4 is a flowchart illustrating an exemplary address assignment process consistent with the principles of the invention.

FIG. 4 is a flowchart illustrating an exemplary address assignment process consistent with the principles of the invention. For purposes of illustration, the flowchart of FIG. 4 will be described in reference to FIG. 2, although the process may be implemented on different architectures from that illustrated in FIG. 2. Furthermore, the flowchart of FIG. 4 will be described in reference to a PPP access request, although the method may be implemented with requests from any of the other access protocols.

Initially, router 20 receives an access request from a subscriber device at one of IFC 50, for example IFC 50A. (100). IFC 50A creates the protocol specific interface layer, such as PPP interface layer 54, to support the subscriber device request (102). PPP interface layer 54 issues an address request to the appropriate protocol specific client, for example, PPP client 30B, within control unit 22 (104). PPP client 30B invokes universal API 28 of APM 26 to request an address (106). APM 26 assigns an address from aggregated address pool 24 and instantiates an address object with the aggregated address pool (108), and forwards the address information to PPP Client 30B via API 28 (110). PPP Client 30B issues the address to PPP interface layer 54 within IFC 50A (112). PPP Interface layer 54 creates the subscriber device address and forwards the address to the subscriber device for use when connecting to router 20 (114).

Various embodiments of the invention have been described. These and other embodiments are within the scope of the following claims.

The invention claimed is:

1. A method comprising:

defining, with an address manager executing on a processor of a network device, a base network address object data type that specifies generic attributes needed for any type of network address assignment regardless of which of a plurality of different network access protocols is used to request a network address;

defining, with the address manager, a plurality of different protocol-specific network address object data types that each specifies protocol-specific attributes needed for network address assignment for a respective one of the plurality of the network access protocols;

receiving, with the network device, network address requests from a plurality of subscriber devices in accordance with the plurality of different network access protocols;

processing the network address requests with a plurality of software clients executing within the network device to invoke the address manager, wherein each of the plurality of software clients services a different one of a plurality of protocol-specific network access request types for the different network access protocols and invokes the address manager via a universal application programming interface (API) regardless of the network access protocol by which the network address is requested;

for each of the requests, instantiating with the address manager an address object within an aggregated pool of network addresses and assigning a network address from the aggregate pool of network addresses to the instantiated address object, wherein the instantiated address object includes the protocol-specific attributes from one of the protocol-specific network address object data types and inherits the generic attributes from the base network address object data type;

returning the instantiated address objects from the address manager to the software clients executing on the network device;

with the software clients executing on the network device, creating a protocol-specific network address from each of the address objects based on the generic attributes and the protocol-specific attributes included within the address object;

forwarding the protocol-specific network addresses to the subscriber devices in response to the network address requests;

configuring the aggregated pool of network addresses with a user interface, wherein the user interface presents a unified view for management of the network addresses within the aggregated pool of network addresses for the plurality of different network access protocols; and in response to a command, producing with the user interface an output that combines statistics and configuration parameters of the aggregated pool of network addresses for the plurality of different network access protocols.

2. The method of claim 1,
wherein the network device is a router,
wherein receiving network address requests comprises receiving packets with one or more interface cards within the router, and
wherein processing the requests comprises processing the requests with the address manager executing within a control unit of the router.

3. The method of claim 2,
wherein the aggregated pool of network addresses resides within the control unit of the router.

4. The method of claim 1,
wherein processing the requests with the address manager comprises communicating with an authentication server external to the network device, and
wherein the aggregated pool of network addresses resides within the authentication server.

5. The method of claim 1, wherein the aggregated pool of network addresses resides within a Dynamic Host Configuration Protocol (DHCP) server external to the network device.

6. The method of claim 1, wherein the aggregated pool of network addresses resides within a Dynamic Host Configuration Protocol (DHCP) server proxy that is external to the network device.

7. The method of claim 1, wherein receiving network address requests comprises receiving generic address requests that do not specify protocols with which the network addresses will be used.

8. The method of claim 1, wherein receiving network address requests comprises receiving protocol-specific address requests that specify protocols with which the network addresses will be used.

9. A method comprising:
receiving within a network device network address requests from a plurality of clients in accordance with a plurality of different network access protocols, wherein each client services one of a plurality of protocol-specific network access request types received by the network device, wherein receiving network address requests comprises providing a universal object-oriented application programming interface (API) by which software modules executing within the network device request network addresses in the same manner regardless of the protocols with which the network addresses will be used;
processing the requests with an address manager executing within the network device to select network addresses from an aggregated pool of network addresses, wherein processing the requests with the address manager comprises instantiating address objects within the aggregated pool of network addresses that include generic attributes unrelated to a particular protocol as well as protocol-specific attributes;
assigning the network addresses to the clients;
returning the instantiated address objects from the address manager to the clients executing on the network device;
with the clients executing on the network device, creating a protocol-specific network address from each of the address objects based on the generic attributes and the protocol-specific attributes included within the address object;
configuring the aggregated pool of network addresses with a user interface, wherein the user interface presents a unified view for management of the network addresses within the aggregated pool of network addresses for the plurality of different network access protocols; and
in response to a command, producing with the user interface an output that combines statistics and configuration parameters of the aggregated pool of network addresses for the plurality of different network access protocols.

10. A computer-readable medium comprising instructions that cause a programmable processor to:
define, with an address manager executing on a processor of a network device, a base network address object data type that specifies generic attributes needed for any type of network address assignment regardless of which of a plurality of different network access protocols is used to request a network address;
define, with the address manager, a plurality of different protocol-specific network address object data types that each specifies protocol-specific attributes needed for network address assignment for a respective one of the plurality of the network access protocols; and
receive network address requests from a plurality of subscriber devices in accordance with the plurality of different network access protocols,
process the network address requests with a plurality of software clients executing within the network device to invoke the address manager, wherein each software client services a different one of a plurality of protocol-specific network access request types for the different network access protocols and invokes the address manager via an application programming interface (API);
for each of the requests, instantiate with the address manager an address object within the aggregated pool of network addresses and assign a network address from the aggregate pool of network addresses to the instantiated address object, wherein the address object includes the protocol-specific attributes from one of the protocol-specific network address object data types and inherits the generic attributes from the base network address object data type;
return the instantiated address objects from the address manager to the software clients executing on the network device;
with the software clients executing on the network device, create a protocol-specific network address from each of the address objects based on the generic attributes and the protocol-specific attributes included within the address object; and
forward the protocol-specific network addresses to the subscriber devices in response to the network address requests;
configure the aggregated pool of network addresses with a user interface, wherein the user interface presents a unified view for management of the network addresses within the aggregated pool of network addresses for the plurality of different network access protocols; and
in response to a command, produce with the user interface an output that combines statistics and configuration parameters of the aggregated pool of network addresses for the plurality of different network access protocols.

11. A network device comprising:
a control unit having one or more processors and a storage medium storing data defining a base network address object data type that specifies generic attributes needed for any type of network address assignment regardless of which of a plurality of different network access protocols is used to request a network address and a plurality of different protocol-specific network address object data types that each specifies protocol-specific attributes needed for network address assignment for a respective one of the plurality of the network access protocols;

one or more interface cards that receive network address requests from a plurality of subscriber devices in accordance with a plurality of different network access protocols;

an aggregated pool of network addresses;

an address manager executing within the control unit that processes the network address requests, wherein, in response to each of the network address requests, the address manager instantiates an address object within the aggregated pool of network addresses and assigns a network address from the aggregate pool of network addresses to the instantiated address object, the address object having the protocol-specific attributes from one of the protocol-specific network address object data types and inheriting the generic attributes from the base network address object data type, wherein the address manager returns the instantiated address objects from the address manager to the software clients executing on the network device, wherein the address manager provides a user interface for configuring the aggregated pool of network addresses and producing, in response to a command, an output that combines statistics and configuration parameters of the aggregated pool of network addresses for the plurality of different network access protocols, and wherein the user interface presents a unified view for management of the network addresses within the aggregated pool of network addresses for the plurality of different network access protocols; and a plurality of software clients executing within the control unit to invoke the address manager in response to each of the requests, wherein each software client services a different one of a plurality of protocol-specific network access request types for the different network access protocols and invokes the address manager via an application programming interface (API), wherein the software clients create a protocol-specific network address from each of the address objects based on the generic attributes and the protocol-specific attributes included within the address object and forward the protocol-specific network addresses to the subscriber devices in response to the network address requests.

12. The network device of claim 11, wherein the requests comprise protocol-specific address requests that specify protocols with which the network addresses will be used.

13. A network device comprising:

an aggregated pool of network addresses;

one or more interface cards that receive network address requests from a plurality of subscriber devices in accordance with a plurality of different network access protocols;

an address manager executing within a control unit that processes the network address requests, wherein, in response to the network address requests, the address manager selects network addresses from the aggregated pool of network addresses, wherein the address manger instantiates address objects that include generic attributes unrelated to a particular protocol as well as protocol-specific attributes, wherein the address manager presents a universal object-oriented application programming interface (API) by which software modules executing within the network device issue the network address requests in the same manner regardless of the protocols with which the network addresses will be used, wherein the address manager returns the instantiated address objects from the address manager to the software modules executing on the network device, wherein the software modules create a protocol-specific network address from each of the address objects based on the generic attributes and the protocol-specific attributes, wherein the software modules forward the protocol-specific network addresses to the subscriber devices in response to the network address requests, wherein the address manager provides a user interface for configuring the aggregated pool of network addresses and producing, in response to a command, an output that combines statistics and configuration parameters of the aggregated pool of network addresses for the plurality of different network access protocols, and wherein the user interface presents a unified view for management of the network addresses within the aggregated pool of network addresses for the plurality of different network access protocols.

14. A network system comprising:

a plurality of subscriber devices; and a router that includes a processor executing a software module and an address manager that maintains an aggregated pool of network addresses, wherein the address manager presents a single interface to receive network address requests for a plurality of different network access protocols and assigns the network addresses to the plurality of subscriber devices from the aggregated pool of network addresses by instantiating address objects that include generic attributes unrelated to a particular protocol as well as protocol-specific attributes, wherein the address manager presents a universal object-oriented application programming interface (API) by which software modules executing within the router issue the network address requests, wherein the address manager returns the instantiated address objects from the address manager to the software modules executing on the router, wherein the software modules create a protocol-specific network address from each of the address objects based on the generic attributes and the protocol-specific attributes of the objects, wherein the software modules forward the protocol-specific network addresses to the subscriber devices in response to the network address requests, wherein the address manager provides a user interface for configuring the aggregated pool of network addresses and producing, in response to a command, an output that combines statistics and configuration parameters of the aggregated pool of network addresses for the plurality of different network access protocols, and wherein the user interface presents a unified view for management of the network addresses within the aggregated pool of network addresses for the plurality of different network access protocols.

15. The network system of claim 14, wherein the address manager receives generic address requests from the plurality of subscriber devices.

16. The network system of claim 14, wherein the address manager receives protocol-specific address requests from the plurality of subscriber devices.

17. The method of claim 1, further comprising:

receiving, with a user interface, rules that govern the assignment of addresses to subscriber devices including rules designating ranges of addresses within the aggregated address pool from which to select and allocate the network addresses for different ones of the network access protocol; and assigning the network addresses to the subscriber devices from the aggregated address pool based on the rules.

18. The method of claim 9, further comprising:

defining a base network address object data type that specifies the generic attributes needed for any type of network address assignment regardless of the type of network access protocol;

defining one or more protocol-specific network address object data type that specifies the protocol-specific attributes needed for network address assignment for the network access protocols; and for each of the requests, assigning a network address from the aggregate pool of network addresses to a corresponding one of the instantiated address objects, wherein the address object includes the protocol-specific attributes from one of the protocol-specific network address object data types and inherits the generic attributes from the base network address object data type.

19. The method of claim 1, wherein the plurality of different protocol-specific network address object data types comprise:

(1) a Dynamic Host Configuration Protocol (DHCP) object data type that specifies the protocol-specific attributes needed for assigning a network address as including a default router, a DNS server, a domain name, a DHCP lease time, a network basic input/output system (NetBIOS) name server to be used, and NetBIOS node type for the subscriber, and (2) a Point to Point Protocol (PPP) object data type that specifies the protocol-specific attributes needed for assigning a network address as including a starting Internet Protocol (IP) address, an ending IP address, a DNS address, a keep-alive time.

\* \* \* \* \*